(12) United States Patent
Vogt (10) Patent No.: US 11,243,394 B2
(45) Date of Patent: Feb. 8, 2022

(54) PROGRESSIVE ASPHERIC CORRECTION FOR ELECTRICALLY TUNABLE LENS OPTICAL PATH

(71) Applicant: Fluorescence Microscopy Business Unit (FMBU) of Bruker Nano Surfaces Division, Madison, WI (US)

(72) Inventor: William I. Vogt, Madison, WI (US)

(73) Assignee: Fluorescence Microscopy Business Unit (FMBU) of Bruker Nano Surfaces Division, Madison, WI (US)

(*) Notice: Subject to any disclaimer, the term of this patent is extended or adjusted under 35 U.S.C. 154(b) by 61 days.

(21) Appl. No.: 16/666,641

(22) Filed: Oct. 29, 2019

(65) Prior Publication Data

US 2020/0142188 A1 May 7, 2020

Related U.S. Application Data

(60) Provisional application No. 62/755,149, filed on Nov. 2, 2018.

(51) Int. Cl.
| | | |
|---|---|---|
| *G02B 21/00* | (2006.01) | |
| *G02B 27/00* | (2006.01) | |
| *G02B 21/24* | (2006.01) | |

(52) U.S. Cl.
CPC ..... *G02B 27/0025* (2013.01); *G02B 21/0024* (2013.01); *G02B 21/0076* (2013.01); *G02B 21/241* (2013.01)

(58) Field of Classification Search
CPC ............ G02B 27/0025; G02B 21/0024; G02B 21/0076; G02B 21/241; G02B 3/02; G02B 3/12; G02B 3/14; G02B 13/002; G02B 13/0025; G02B 13/0055; G02B 13/0075; G02B 13/18; G02B 21/0032
USPC ....... 359/368, 290, 291, 362, 363, 369, 379, 359/380, 642, 665, 666, 708, 718, 721
See application file for complete search history.

(56) References Cited

U.S. PATENT DOCUMENTS

| | | | | |
|---|---|---|---|---|
| 5,559,637 A | * | 9/1996 | Moskovich | ........ G02B 27/0025 359/362 |
| 6,097,545 A | | 8/2000 | Vaughan | |
| 6,598,976 B2 | | 7/2003 | Westort et al. | |
| 6,621,593 B1 | | 9/2003 | Wang et al. | |
| 2006/0056042 A1 | | 3/2006 | Kim et al. | |
| 2010/0231783 A1 | * | 9/2010 | Bueler | ..................... G02B 7/04 348/347 |
| 2011/0058258 A1 | | 3/2011 | Wang et al. | |
| 2016/0358001 A1 | | 12/2016 | Chen et al. | |
| 2017/0068134 A1 | | 3/2017 | Yadin et al. | |
| 2017/0108683 A1 | * | 4/2017 | Miyazono | ................ G02B 3/14 |

(Continued)

OTHER PUBLICATIONS

PCT International Search Report and Written Opinion, dated Jan. 29, 2020, PCT/US2019/058538.

*Primary Examiner* — Arnel C Lavarias
(74) *Attorney, Agent, or Firm* — Joseph T. Leone, Esq.; DeWitt LLP (57) ABSTRACT

A method and corresponding optical device to correct spherical aberration in an optical path caused by an electrically tunable lens (ETL) within the optical path. The method includes placing within the optical path and in working relationship with the ETL an aspherical correction lens dimensioned and configured to reduce spherical aberration in a light beam exiting the ETL.

13 Claims, 11 Drawing Sheets

(56) References Cited

U.S. PATENT DOCUMENTS

2018/0224645 A1     8/2018   Dohi
2018/0246354 A1     8/2018   Popovich et al.

\* cited by examiner

PROGRESSIVE ASPHERIC CORRECTION FOR ELECTRICALLY TUNABLE LENS OPTICAL PATH

CROSS-REFERENCE TO RELATED APPLICATIONS

Priority is hereby claimed to provisional application Ser. No. 62/755,149, filed Nov. 2, 2018, which is incorporated herein by reference.

BACKGROUND

Figure 1:
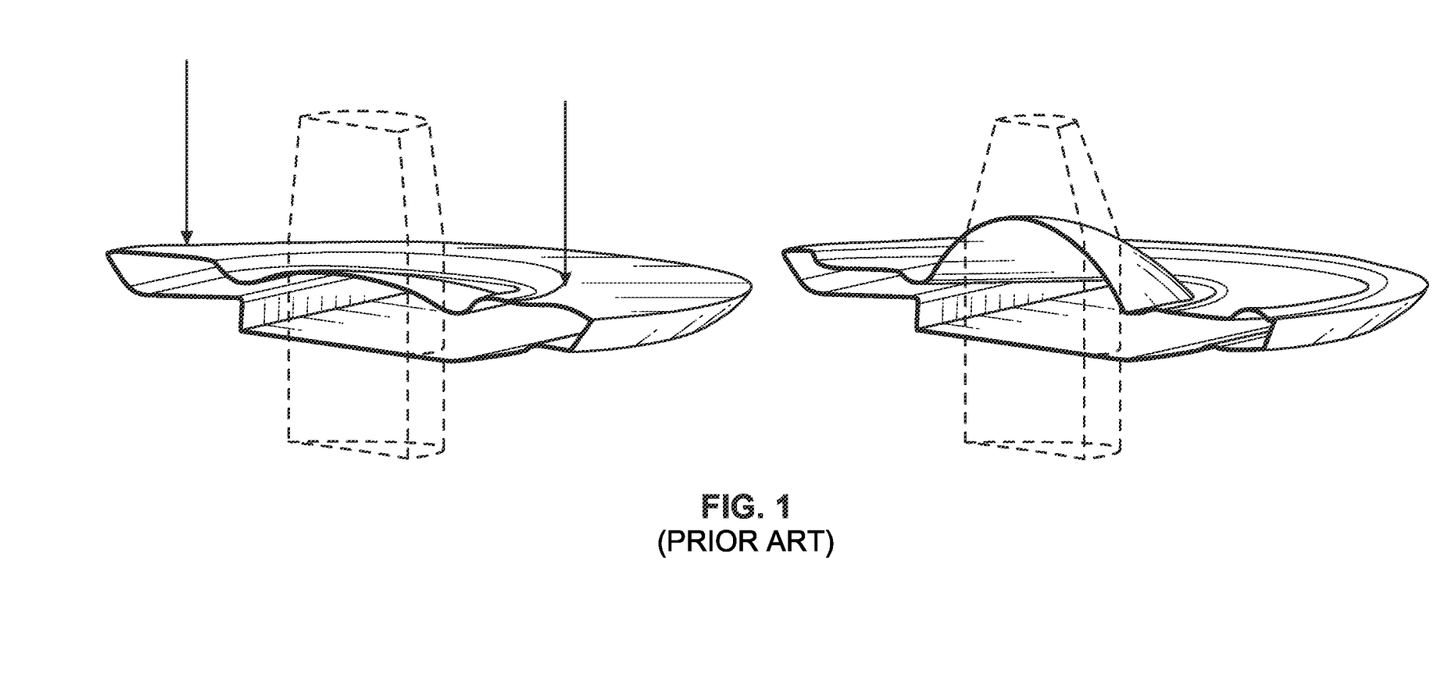
FIG. 1 is a schematic diagram of a prior art commercial electrically tunable lens Optotune Switzerland AG; Dietikon, Switzerland.

Electrically tunable lenses (ETL's) are known and available commercially. For example, Optotune Switzerland AG, (Dietikon, Switzerland), manufactures a line of electrically tunable lenses that are marketed worldwide. FIG. 1, which is part of the prior art, depicts the basic design of a style of electrically tunable lenses made by Optotune. As shown in FIG. 1, the lens is fabricated from a flexible film or membrane enclosing an optical fluid. The curvature of the lens is adjusted by applying an electric current to a voice coil or bobbin that surrounds perimeter of the lens. The focal length of the lens can thus be changed very quickly (within milliseconds) by means of mated controller (also available commercially), which is tuned to a desired value within very few milliseconds.

ETLs are desirable because a change in the radius of only a few micrometers in the ETL can have the same optical effect as moving the entire lens several centimeters. This allows for compact optical device design, while still maintaining broad functionality and range of operation. Thus, electrically tunable lens yield optical systems that are more compact, oftentimes require fewer total lenses, and less translational movement of the lenses. This reduces the need for high-precision mechanical actuators to physically re-position lenses. Less potential movement of the lenses within the optical path leads to more robust designs.

A disadvantage of ETLs is that they have an increasing spherical aberration component that is proportional with increasing power or curvature (i.e., decreasing focal length) of the ETL. The increased spherical aberration of the ETL degrades the axial point spread function (PSF) at the sample plane when the ETL is driven toward the short end of its focal length range. This, in turn, blurs the ultimate image that can be generated with the optical device.

SUMMARY

Disclosed Herein are the Following

An Optical Device Comprising:

an electrically tunable lens disposed within an optical path and in working relationship with an aspherical correction lens disposed within the optical path and dimensioned and configured to reduce spherical aberration in a light beam exiting the electrically tunable lens.

In some embodiments, the aspherical correction lens of the optical device comprises a first face defining a spherical surface and a second face defining an aspherical surface.

In some embodiments, the aspherical correction lens of the optical device comprises a first face defining a first aspherical surface and a second face defining a second aspherical surface.

In some embodiments, the aspherical surface(s) are progressively aspherical in form, wherein asphericity of the aspherical surface(s) of the aspherical correction lens is defined by $$z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

wherein:
  z=surface sag
  c=curvature (which is the reciprocal of the radius of curvature)
  r=radial aperture component in lens units
  k=conic constant
  α=higher-order aspheric coefficient In some embodiments, the optical device is a confocal microscope.

In some embodiments, the optical device is a microscope dimensioned and configured to perform two-photon excitation microscopy In some embodiments, the optical device is dimensioned and configured to perform monochromatic reflected-light confocal microscopy.

In some embodiments, the optical device is dimensioned and configured to perform single-photon fluorescence microscopy.

A method to correct spherical aberration in an optical path caused by an electrically tunable lens (ETL) within the optical path, the method comprising placing within the optical path and in working relationship with the ETL an aspherical correction lens dimensioned and configured to reduce spherical aberration in a light beam exiting the ETL.

DETAILED DESCRIPTION

Disclosed herein is an optical device comprising an electrically tunable lens (ETL) disposed within an optical path in working relationship with an aspherical correction lens. As the ETL is tuned, its spherical aberration changes. The aspherical correction lens is disposed within the same optical path as the ETL and is dimensioned and configured to reduce spherical aberration in the light beam exiting the ETL. Of particular note is that the aspherical surface (or surfaces) of the aspherical correction lens are shaped in such a fashion as to yield progressive spherical aberration reduction throughout the entire focal length range of the ETL, but especially when the ETL is at or near the lower limit of its focal length (i.e., when the ETL is at or near its maximum magnification).

Figure 2:
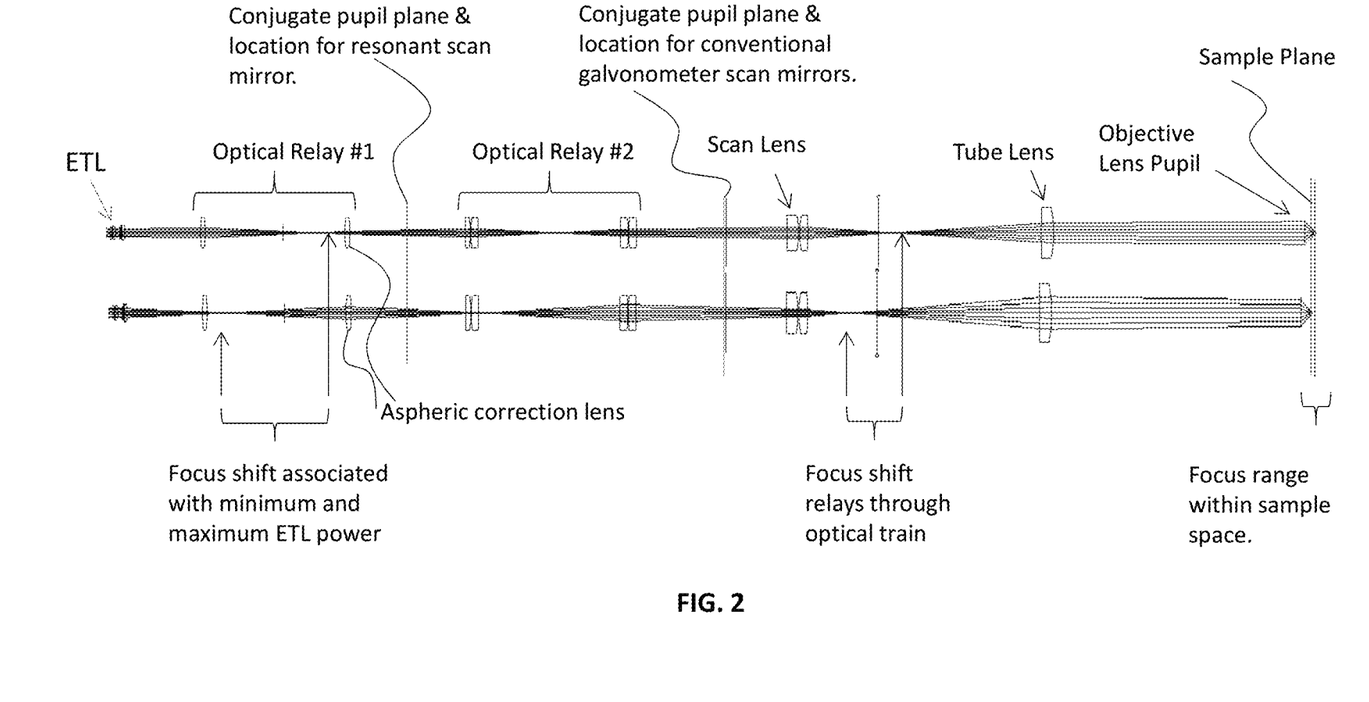
FIG. 2 is a schematic diagram of an illustrative optical path of the subject method and device.

The optical device and corresponding method and principle of operation are illustrated in FIG. 2. Here, the upper and lower panels show the same optical path that starts on the left with an ETL. The optical path itself is shown within the context of an otherwise conventional confocal microscope. The ETL in the top panel is shown at minimum power; while the ETL in the bottom panel is shown at maximum power. Optical relay 1 in both panels illustrates the focus shift that is associated with the change in focal length of the ETL. Just prior to the left-hand conjugate pupil plane, an aspherical correction lens is disposed within the light path. As can be seen in the top panel of FIG. 2, at low magnification, the light beam diameter passing through the aspherical correction lens is relatively small when the ETL is at its lowest magnification. As can be seen in the lower panel, though, when the ETL is at its highest magnification, the beam diameter passing through the aspherical correction lens is much larger. The asphericity of aspherical correction lens is progressive and is matched the spherical aberration component of its associated ETL. Thus, as the spherical aberration component of the ETL increases, so does the beam diameter passing through the aspherical correction lens, and so too does the correction applied by the asphericity of the correction lens. That is, the correction applied by the asphericity of the aspherical correction lens is larger the farther the distance the beam is from the optical axis of the lens.

The remainder of FIG. 2 is convention. The light beam, with its spherical aberration reduced after exiting the correction lens, passes through optical relay #2, the second conjugate pupil plane, the tube lens, objective lens, and is focused onto the sample. The focal length of the ETL is then altered to adjust the point of focus in the z-plane within the sample plane.

Figure 3A:
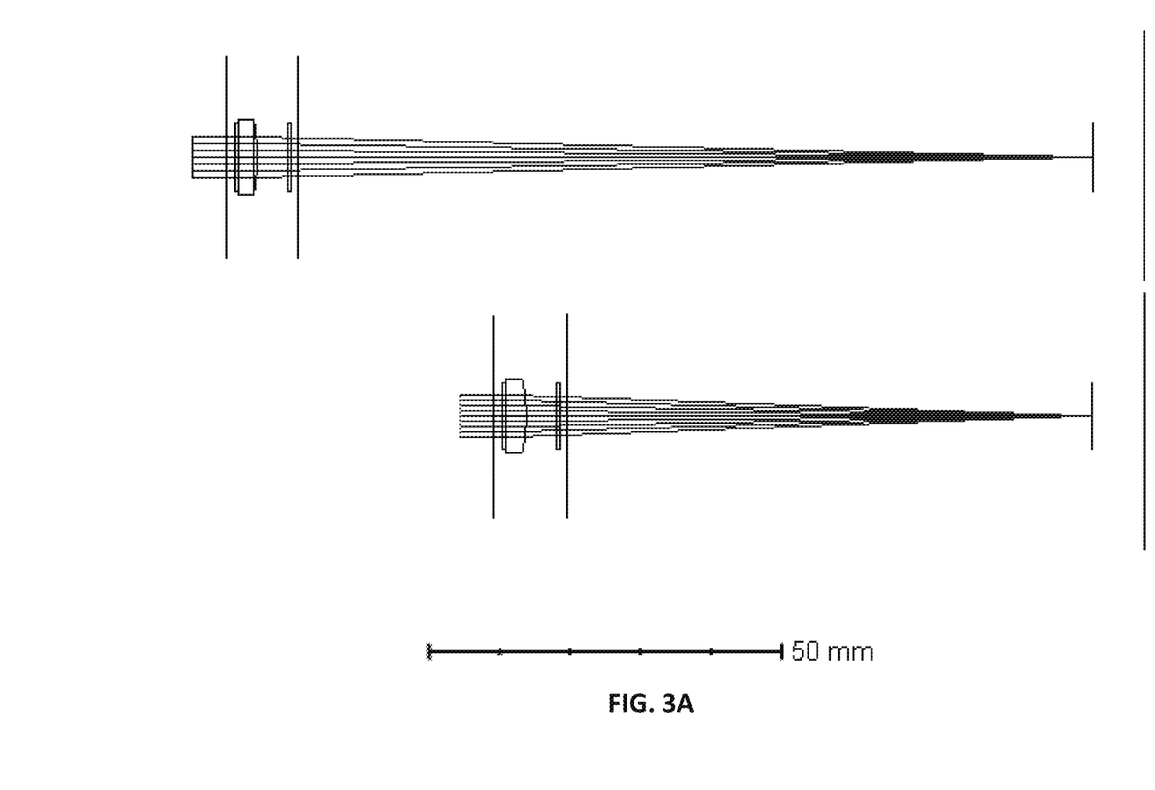
FIG. 3A is a paired set of is a schematic light path illustrating that at long focal lengths/low magnification (top panel), ETLs have relatively small spherical aberration and high-quality axial PSF, while at short focal lengths/high magnification, ETLs have increased spherical aberration and blurred axial PSF (bottom panel).
Figure 3B:
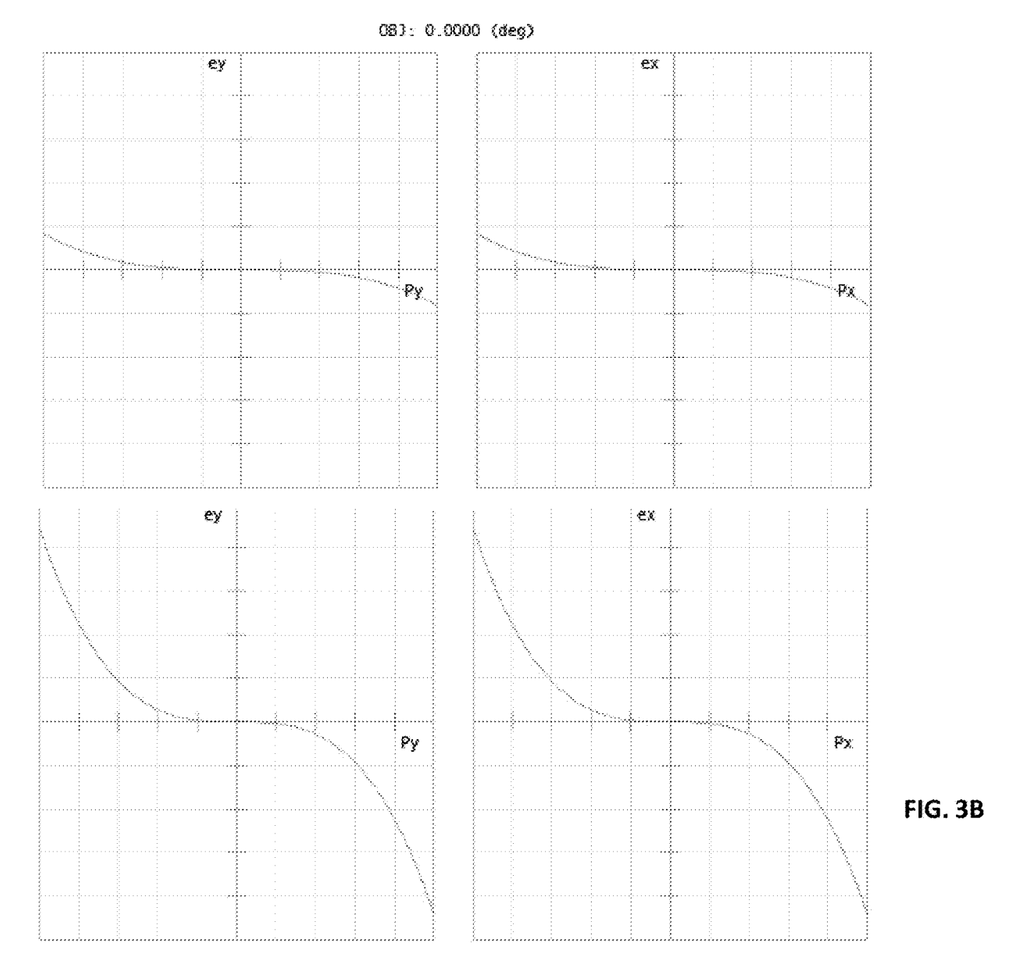
FIG. 3B is a paired set of transverse fan plots corresponding to FIG. 3A showing spherical aberration of the ETL at long focal lengths (top panel) versus short focal lengths (bottom panel). The upper-left plot shows Y-plane aberration and the upper-right plot shows X-plane aberration at long ETL focal length. The lower-left plot shows Y-plane aberration and the lower-right plot shows X-plane aberration at short ETL focal length.
Figure 3C:
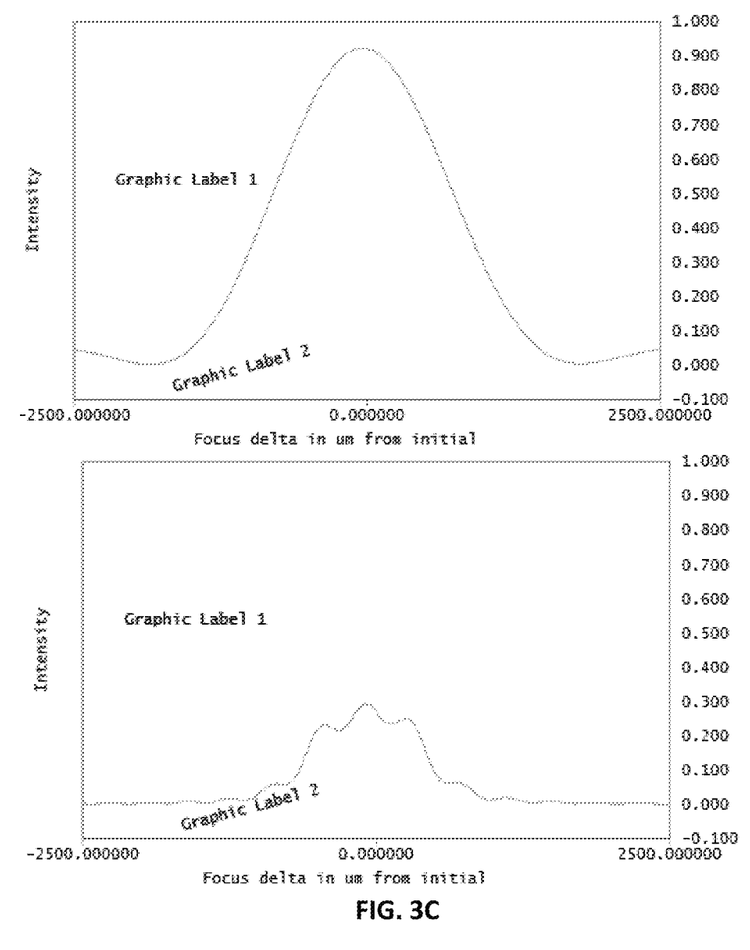
FIG. 3C is a paired set of axial PSF plots corresponding to FIG. 3A showing axial PSF as a function of longer focal length (top panel) versus shorter focal length (bottom panel) in an ETL.

FIGS. 3A, 3B, and 3C show the problem at hand in isolation, with respect to the spherical aberration and degraded PSF of the ETL at short focal lengths. In each of these three figures, the top panel shows the condition of the ETL at low current/low magnification/long focal length. The bottom panel in each of FIGS. 3A, 3B, and 3C shows the condition of the ETL at high current/high magnification/ short focal length. FIG. 3A is a simple schematic ray diagram of a light beam exiting the ETL and to a focal point. The top panel in FIG. 3A shows the ETL at low current/low magnification/long focal length; the bottom panel in FIG. 3A shows the ETL at high current/high magnification/short focal length.

FIG. 3B illustrates the impact of decreasing the focal length on a typical commercial ETL on the spherical aberration of the lens. The two upper plots in FIG. 3B record the spherical aberration of the ETL at low magnification/long focal length. The aberration here is small and generally acceptable. At low magnification, the spherical aberration is small enough that it does not have a significant adverse impact on the axial PSF. The two lower plots in FIG. 3B record the spherical aberration of the ETL at high magnification/short focal length. The spherical aberration here is large, significant, and unacceptable. At high ETL magnification, the spherical aberration significantly degrades axial PSF and thus degrades the clarity of the images that can be generated at high magnification.

The axial PSF for the ETL shown in FIG. 1 is presented in FIG. 3C at low magnification (top panel) and high magnification (bottom panel). Here, the impact of the increasing spherical aberration of the ETL at higher magnification is easily seen. The Airy function in the top panel (low magnification) is smooth, symmetrical, and well-focused. In contrast, the Airy function in the bottom panel (high magnification) is flattened and "smeared." As a result, images gathered at high magnification using this ETL are blurred.

Figure 4:
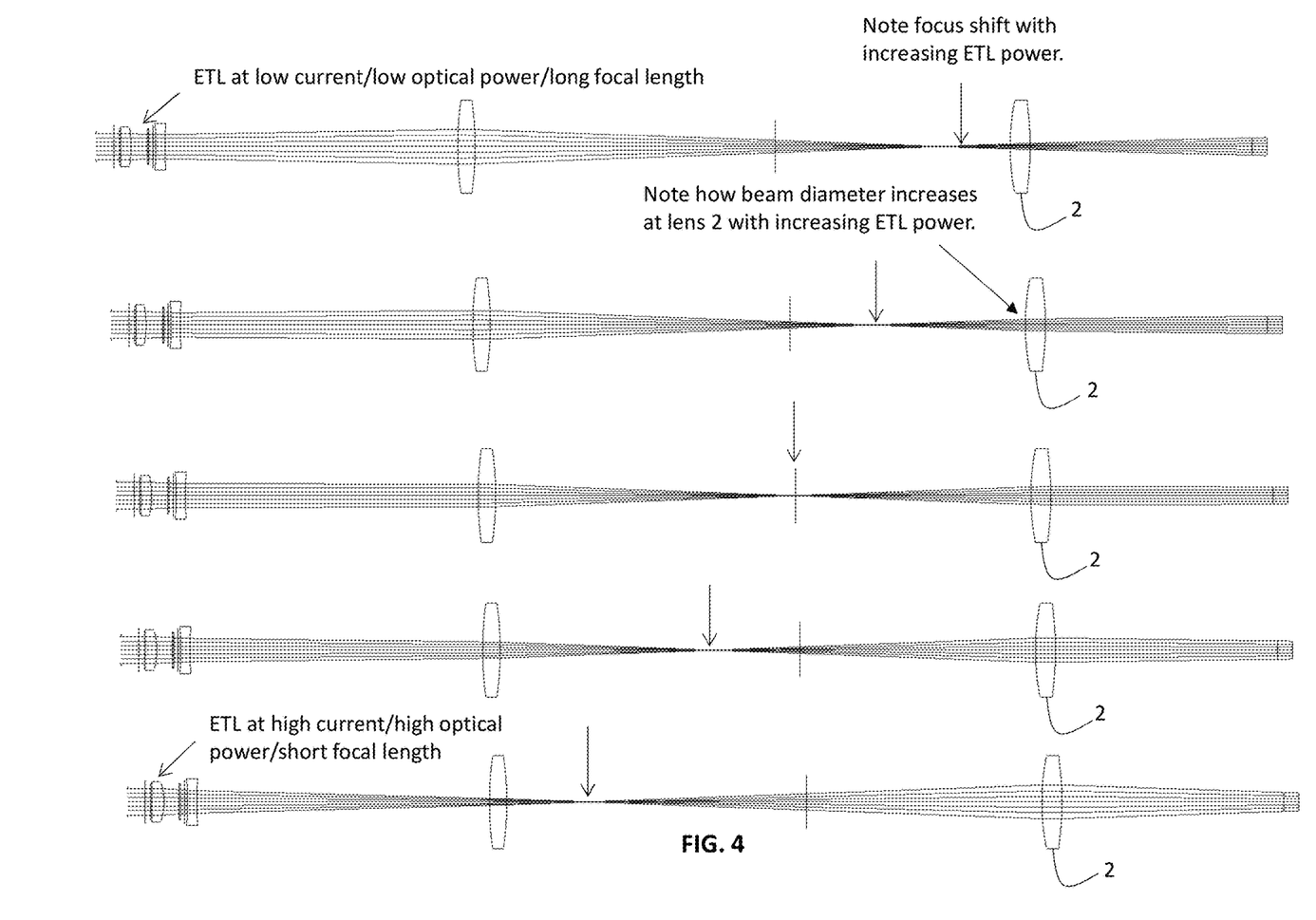
FIG. 4 is a schematic optical path illustrating the focus shift as a function of ETL focal length, and illustrating that the beam diameter increases at aspheric correction lens 2 as focal length decreases (going from top to bottom of the figure).

Referring now to FIG. 4, to address the changing spherical aberration component of an ETL, the present method uses an aspherical lens 2, whose asphericity increases progressively with increased distance from the optical axis of the lens 2. FIG. 4 shows a series of ray tracings with the ETL going from low magnificent/long focal length at the top, to high magnification/short focal length at the bottom. The downward pointing arrows show the focal point as magnification of the ETL increases. As can be seen from FIG. 4, the beam diameter passing through aspherical lens 2 increases greatly as the ETL is canned from lowest power and smallest spherical aberration (top panel) to highest power and highest spherical aberration (bottom panel). The progressive asphericity of lens 2 is dimensioned and configured to correct the spherical aberration when a beam of relatively larger diameter passes through it. In this manner, even when the ETL is driven to its highest magnification, aspherical lens 2 yields a focused beam with minimal spherical aberration and a high-quality axial PSF. That is, the aberrant rays of the optical path are distributed with an increasing severity that is proportional to their increasing distance from the optical axis. Thus, by employing progressive aspherical lens 2, the most aberrant rays (i.e., those furthest from the optical axis of lens 2) are corrected the most and thus brought back into focus. The resulting axial PSF of the device is thereby greatly improved.

Figure 5A:
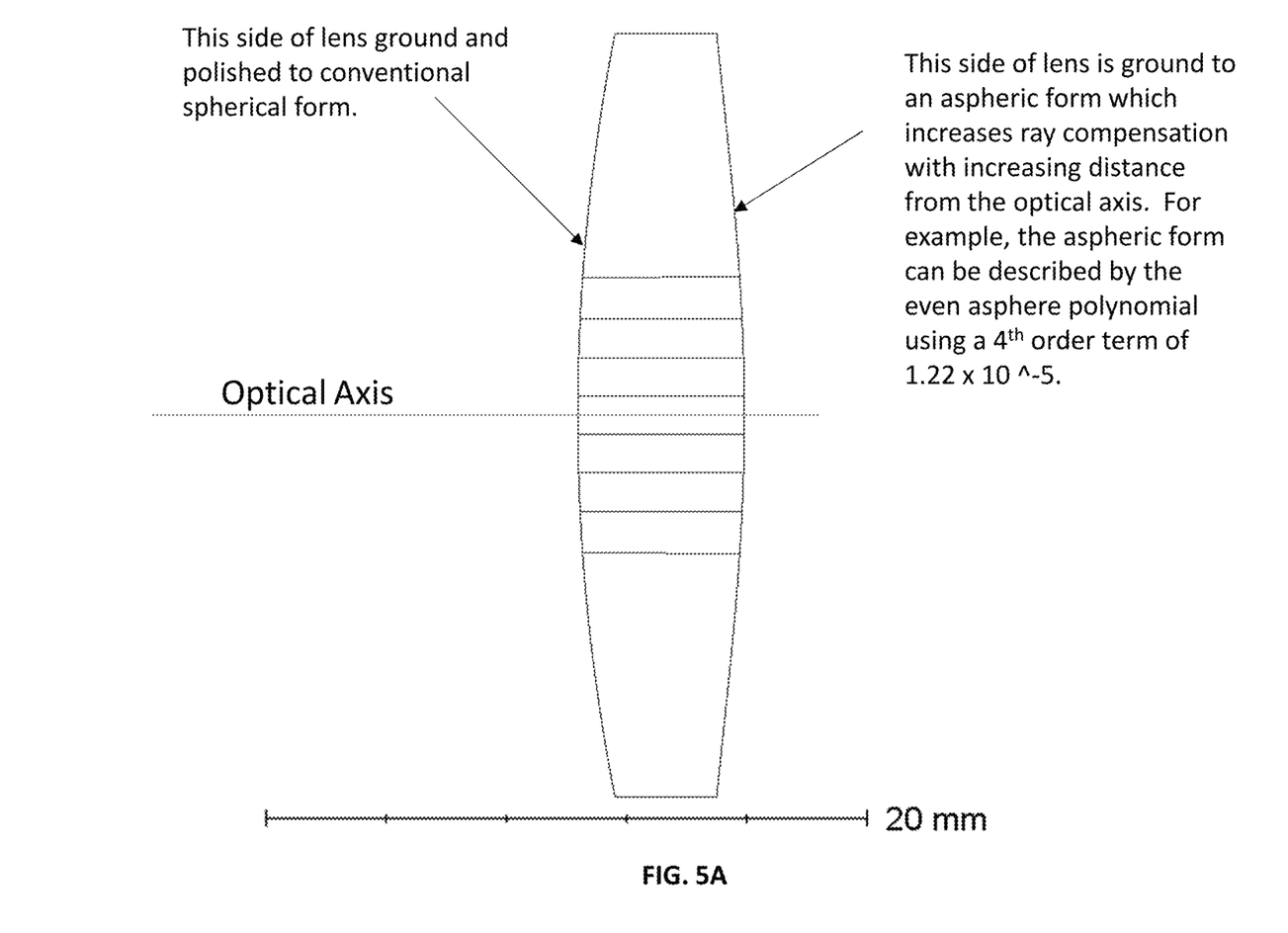
FIG. 5A is a schematic diagram of a relay lens according to the present method and device. One face of the lens is spherical while the other face of the lens is ground to a aspheric form.
Figure 5B:
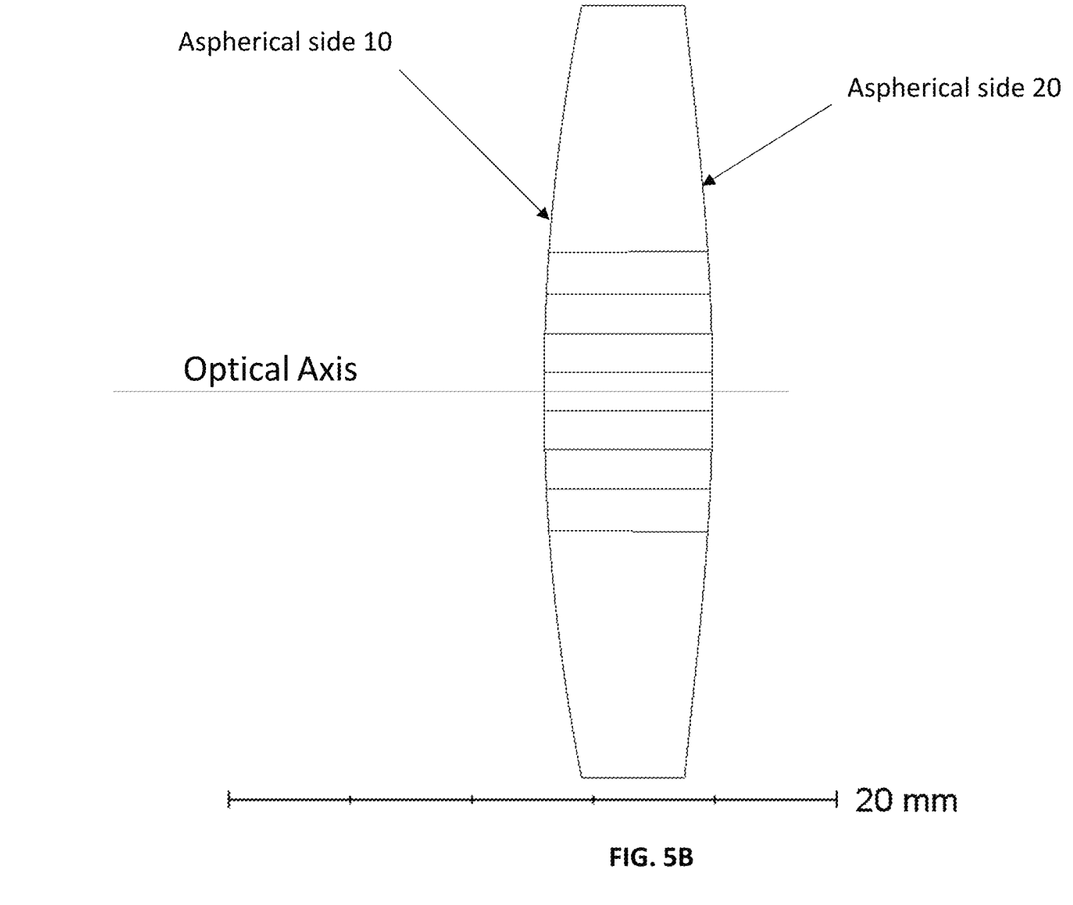
FIG. 5B is identical to FIG. 5A, except both faces of the lens are aspherical.

The asphericity of lens 2 is dimensioned to correct the increasing spherical aberration of the ETL as it is scanned from its lowest magnification to its highest magnification. At least one of the lens faces is aspherical; both of the lens faces may also be aspherical. See FIGS. 5A and 5B. In FIG. 5A, the left-hand face of the lens is ground to a conventional spherical form. The left-hand face of the lens is ground to an aspherical form which increases ray compensation with increasing distance from the optical axis. FIG. 5B shows a similar lens in which both faces have been ground to aspherical forms.

Figure 6:
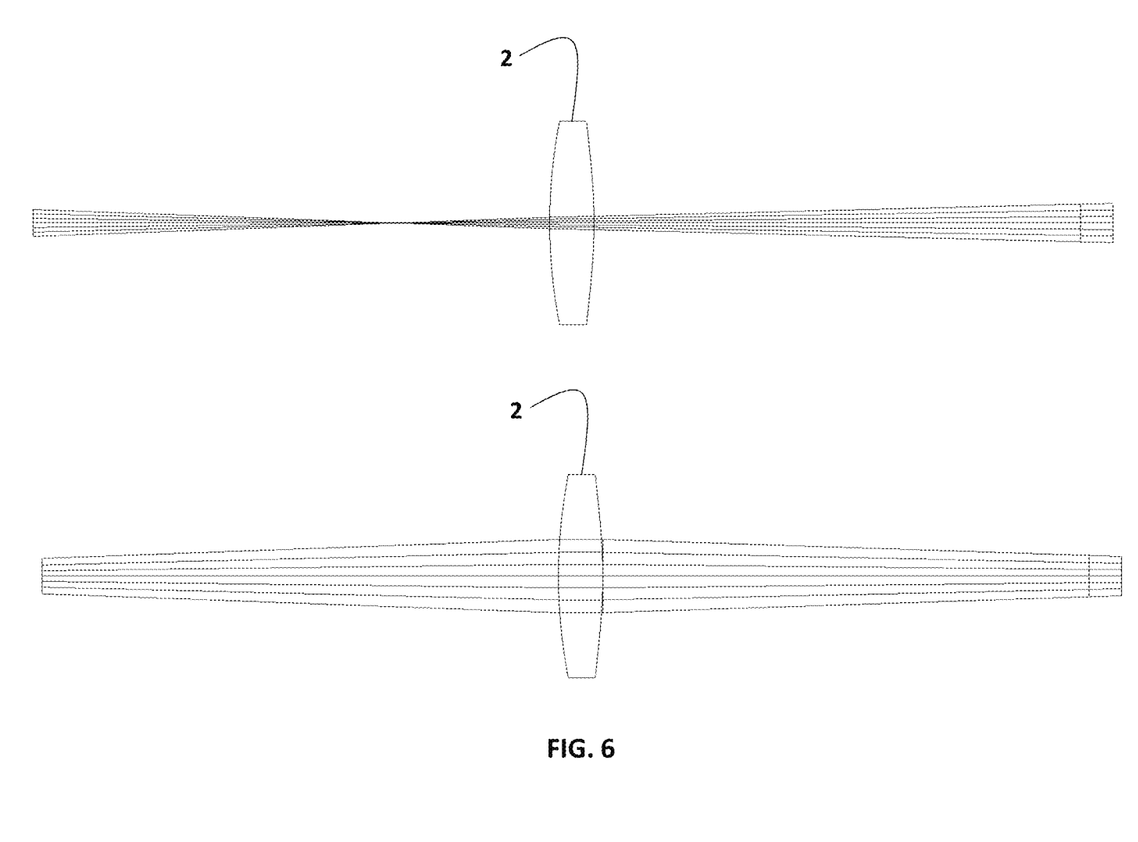
FIG. 6 is a magnified view of the beam diameter at aspheric correction lens 2 at low ETL magnification (top panel) and high ETL magnification (bottom panel) (ETL not shown).

It is preferred, but not required, that the aspherical face is ground to an aspherical form which increases ray compensation with increasing distance from the optical axis. For example, the aspheric form can be described by the even asphere polynomial using a 4th order term of $1.22 \times 10^{-5}$:

$$z = \frac{cr^2}{1+\sqrt{1-(1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

wherein:
z=surface sag
c=curvature (which is the reciprocal of the radius of curvature)
r=radial aperture component in lens units
k=conic constant
α=higher-order aspheric coefficient FIG. 6 illustrates the ETL spherical aberration problem in isolation. In the top panel of FIG. 6, the light emanating from an ETL at low power/low magnification is shown. The light is coming from the left in the figure and the ETL itself is not depicted. The focal point, which is close to aspherical lens 2, is seen in the top panel of FIG. 6. In this low magnification state of the ETL, the diameter of the beam passing through aspherical lens 2 is small. The overall spherical aberration of the beam is likewise small and requires only minimal correction as it passes through aspherical lens 2. Because the asphericity of lens 2 is progressively increased going away from the optical axis of the lens, the spherical correction applied to the beam in the top panel of FIG. 6 is small. In contrast, in the bottom panel of FIG. 6, the light emanating from an ETL at high power/high magnification is shown. Here, the focal point is sufficiently short that it is off the left-hand side of the figure. Because the focal point is distant from the aspherical lens 2 in the bottom panel of FIG. 6, the beam diameter as it passes through aspherical lens 2 is quite large. The rays passing through lens 2 at the furthest distances from the optical axis of lens 2 will have very significant spherical aberration. This aberration is thus reduced by the progressive asphericity of lens 2. The graduated distribution of aberrant rays exiting the ETL thus creates the opportunity to add a graduated correction (asphericity) to the curvature of lens 2 which compensates for the given aberration and brings the rays back into proper alignment. Correcting the spherical aberration in this way generates improved axial PSF at the sample plane over the full range of the ETL's focus range.

Figure 7A:
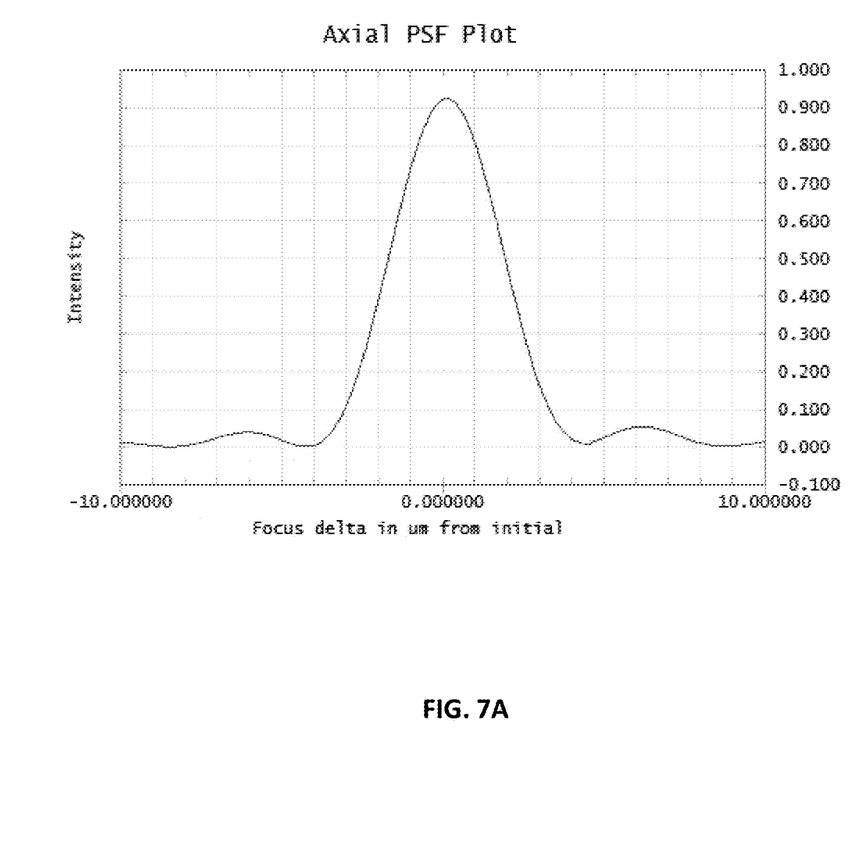
FIGS. 7A and 7B are comparisons of axial PSF with the aspheric correction lens (FIG. 7A) and without the aspheric correction lens (FIG. 7B). As can be seen in comparing the two figures, the axial PSF in FIG. 7A (with the aspherical correction lens) is far better defined than the axial PSF in FIG. 7B (without the aspherical correction lens).
Figure 7B:
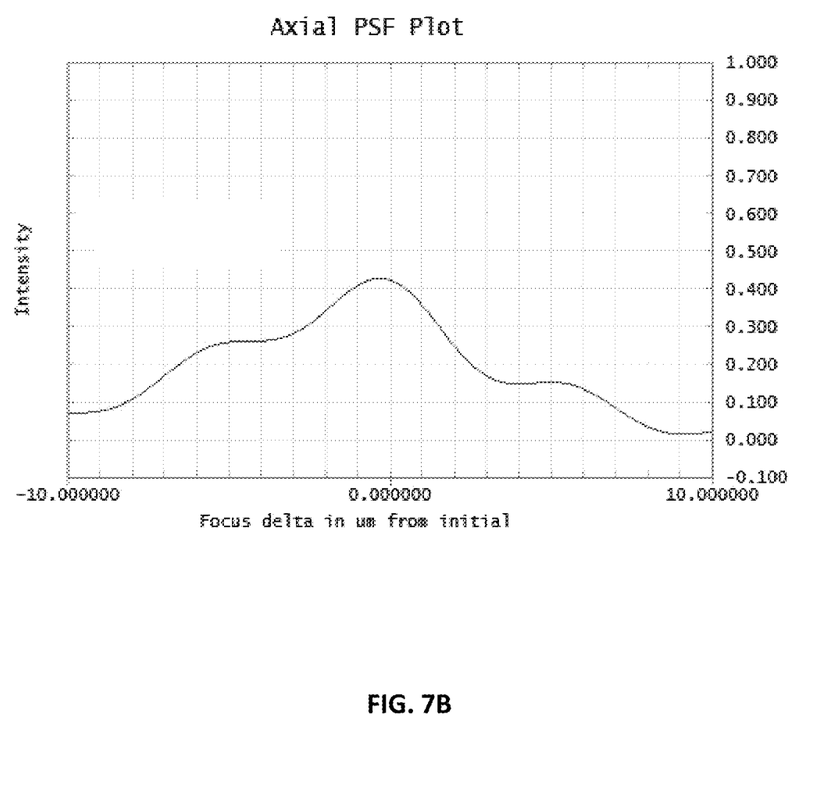

The impact the aspherical correction lens has on axial SPF is striking, as shown in FIGS. 7A and 7B. These two figures show the axial PSF of a commercial ETL with the aspherical correction lens described herein (FIG. 7A) and without the aspherical correction lens (FIG. 7B). As can be seen in comparing the two figures, the axial PSF in FIG. 7A is far better defined than the axial PSF in FIG. 7B.

The aspheric lens 2 is ground to an aspherical form that reduces whatever spherical aberration is presented by the ETL, that is, positive or negative. The aspherical lens itself may be made from conventional materials and ground to the required asphericity. It may also be fabricated in the form of a gradient-index lens, in which case the gradient of the refractive index of the lens material is matched to the spherical aberration of the ETL. Rather than a lens per se, the aspherical correction mechanism may take the form of a reflective or transmissive spatial light modulator or diffraction grating.

The correction technique can be used in any optical device that utilized ETLs. It is especially beneficial in two-photon excitation microscopy, monochromatic reflected light confocal microscopy, single photon fluorescence microscopy, and the like.

What is claimed is:

1. An optical device comprising:
   an electrically tunable lens disposed within an optical path and in working relationship with
   an aspherical correction lens disposed within the optical path and dimensioned and configured to reduce spherical aberration in a light beam exiting the electrically tunable lens;
   wherein the aspherical correction lens comprises a first face defining a spherical surface and a second face defining an aspherical surface; and
   wherein the aspherical surface(s) are progressively aspherical in form.

2. The optical device of claim 1, wherein asphericity of the aspherical surface of the aspherical correction lens is defined by $$z = \frac{cr^2}{1+\sqrt{1-(1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

wherein:
z=surface sag
c=curvature (which is the reciprocal of the radius of curvature)
r=radial aperture component in lens units
k=conic constant
α=higher-order aspheric coefficient.

3. The optical device of claim 2, which is a confocal microscope.

4. The optical device of claim 2, which is a microscope dimensioned and configured to perform two-photon excitation microscopy.

5. The optical device of claim 2, which is dimensioned and configured to perform monochromatic reflected-light confocal microscopy.

6. The optical device of claim 2, which is dimensioned and configured to perform single-photon fluorescence microscopy.

7. An optical device comprising:
   an electrically tunable lens disposed within an optical path and in working relationship with
   an aspherical correction lens disposed within the optical path and dimensioned and configured to reduce spherical aberration in a light beam exiting the electrically tunable lens;
   wherein the aspherical correction lens comprises a first face defining a spherical surface and a second face defining an aspherical surface;
   wherein the aspherical surface(s) are progressively aspherical in form; and wherein asphericity of the aspherical surface of the aspherical correction lens is defined by $$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

wherein:
- z=surface sag
- c=curvature (which is the reciprocal of the radius of curvature)
- r=radial aperture component in lens units
- k=conic constant
- $\alpha$=higher-order aspheric coefficient.

8. The optical device of claim 7, which is a confocal microscope.

9. The optical device of claim 7, which is a microscope dimensioned and configured to perform two-photon excitation microscopy.

10. The optical device of claim 7, which is dimensioned and configured to perform monochromatic reflected-light confocal microscopy.

11. The optical device of claim 7, which is dimensioned and configured to perform single-photon fluorescence microscopy.

12. A method to correct spherical aberration in an optical path caused by an electrically tunable lens (ETL) within the optical path, the method comprising placing within the optical path and in working relationship with the ETL an aspherical correction lens dimensioned and configured to reduce spherical aberration in a light beam exiting the ETL;

wherein the aspherical correction lens comprises a first face defining a spherical surface and a second face defining an aspherical surface; and wherein the aspherical surface(s) are progressively aspherical in form.

13. The method of claim 12, wherein asphericity of the aspherical surface of the aspherical correction lens is defined by $$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16},$$

wherein:
- z=surface sag
- c=curvature (which is the reciprocal of the radius of curvature)
- r=radial aperture component in lens units
- k=conic constant
- $\alpha$=higher-order aspheric coefficient.

* * * * *